US012087247B2

(12) United States Patent
Hua et al.

(10) Patent No.: US 12,087,247 B2
(45) Date of Patent: *Sep. 10, 2024

(54) DRIVING METHOD OF DISPLAY PANEL, DISPLAY PANEL, AND DISPLAY DEVICE DRIVEN BY DRIVING MODES HAVING DIFFERENT FREQUENCIES

(71) Applicant: Xiamen Tianma Micro-Electronics Co., Ltd., Xiamen (CN)

(72) Inventors: Huomei Hua, Xiamen (CN); Rong Chen, Xiamen (CN); Guochang Lai, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,904

(22) Filed: Feb. 17, 2023

(65) Prior Publication Data

US 2023/0206876 A1 Jun. 29, 2023

Related U.S. Application Data

(63) Continuation of application No. 17/201,634, filed on Mar. 15, 2021, now Pat. No. 11,631,378.

(30) Foreign Application Priority Data

Dec. 23, 2020 (CN) ......................... 202011543599.5

(51) Int. Cl.
*G09G 3/36* (2006.01)

(52) U.S. Cl.
CPC ......... *G09G 3/3688* (2013.01); *G09G 3/3677* (2013.01); *G09G 2310/0272* (2013.01); *G09G 2310/0278* (2013.01)

(58) Field of Classification Search
CPC ............... G09G 3/3688; G09G 3/3677; G09G 2310/0278; G09G 2310/0272
See application file for complete search history.

(56) References Cited

U.S. PATENT DOCUMENTS

2012/0056870 A1 3/2012 Koh
2013/0169609 A1 7/2013 Son et al.
(Continued)

FOREIGN PATENT DOCUMENTS

CN 106952605 A 7/2017
CN 110085189 A 8/2019

*Primary Examiner* — Kwang-Su Yang
(74) *Attorney, Agent, or Firm* — Anova Law Group, PLLC

(57) ABSTRACT

A driving method includes driving a display panel at a first-frequency driving mode and a second-frequency driving mode. A first frequency of the first-frequency driving mode is lower than a second frequency of the second-frequency driving mode. In the first-frequency driving mode, a frame time includes a scanning section and a corresponding front and rear porch section immediately following the scanning section. The driving method further includes scanning sub-pixels of the display panel in the scanning section of the first-frequency driving mode, where in the front and rear porch section, the sub-pixels of the display panel are not scanned, and front and rear porch sections corresponding to at least part of a plurality of frames in the first-frequency driving mode include at least one compensation section. The method further includes providing a data signal to each data line of a plurality of data lines of the display panel in a compensation section of the at least one compensation section.

20 Claims, 9 Drawing Sheets

(56) References Cited

U.S. PATENT DOCUMENTS

| | | | | |
|---|---|---|---|---|
| 2016/0189630 | A1* | 6/2016 | Chang | G09G 3/3291 345/76 |
| 2018/0096644 | A1 | 4/2018 | Jang et al. | |
| 2018/0108317 | A1 | 4/2018 | Ji | |
| 2020/0160792 | A1 | 5/2020 | Park et al. | |
| 2020/0219454 | A1 | 7/2020 | Fan et al. | |
| 2020/0335033 | A1 | 10/2020 | Kim et al. | |
| 2020/0357320 | A1 | 11/2020 | Park et al. | |
| 2020/0365096 | A1* | 11/2020 | Xiao | G09G 3/3644 |
| 2021/0272531 | A1 | 9/2021 | Shin et al. | |

* cited by examiner

DRIVING METHOD OF DISPLAY PANEL, DISPLAY PANEL, AND DISPLAY DEVICE DRIVEN BY DRIVING MODES HAVING DIFFERENT FREQUENCIES

CROSS-REFERENCE TO RELATED APPLICATION

This application is a continuation application of U.S. patent application Ser. No. 17/201,634, filed on Mar. 15, 2021, which claims priority of Chinese Patent Application No. 202011543599.5, filed on Dec. 23, 2020, the entire content of each of which is hereby incorporated by reference.

FIELD OF THE DISCLOSURE

The present disclosure generally relates to the field of display technology and, more particularly, relates to a driving method of a display panel, a display panel, and a display device.

BACKGROUND

From a cathode ray tube (CRT) era to a liquid-crystal (LC) era, and to nowadays an organic light-emitting diode (OLED) era, display industry has experienced decades of development, and is progressing rapidly. Display industry is already closely related to our lives. Display technology is indispensable to electronic devices from conventional electronic devices such as a mobile phone, a tablet, a television, and a personal computer (PC), to a smart wearable device and a virtual reality (VR) device.

An existing wearable device usually include two driving modes, a low-frequency driving mode and a high-frequency driving mode. When switching from the high-frequency driving mode to the low-frequency driving mode, since a refresh frequency of the low-frequency mode is lower, leakage current of a driving transistor driving a pixel to emit light may last longer. Accordingly, the leakage current may be more obvious. Moreover, when the leakage current is larger, difference between actual brightness and preset brightness of a pixel may be larger. As a result, screen flashing or flickering may occur in the low-frequency driving mode.

The disclosed structures and methods are directed to solve one or more problems set forth above and other problems in the art.

SUMMARY

One aspect of the present disclosure includes a driving method of a display panel. The driving method includes driving the display panel at a first-frequency driving mode and a second-frequency driving mode. A first frequency of the first-frequency driving mode is lower than a second frequency of the second-frequency driving mode. In the first-frequency driving mode, a frame time includes a scanning section and a corresponding front and rear porch section immediately following the scanning section. The driving method further includes scanning sub-pixels of the display panel in the scanning section of the first-frequency driving mode, where in the front and rear porch section, the sub-pixels of the display panel are not scanned, and front and rear porch sections corresponding to at least part of a plurality of frames in the first-frequency driving mode include at least one compensation section. The method further includes providing a data signal to each data line of a plurality of data lines of the display panel in a compensation section of the at least one compensation section.

Another aspect of the present disclosure includes a display panel. The display panel includes a display area, a non-display area, and a plurality of pixel driving circuits arranged in an array. The plurality of pixel driving circuits are located in the display area, each driving circuit of the plurality of pixel driving circuits includes a driving transistor and a pixel capacitor, and the pixel capacitor corresponds to a sub-pixel. The display panel also includes a plurality of scan lines and a plurality of data lines. A control terminal of the driving transistor is connected to a scan line of the plurality of scan lines, a first terminal of the driving transistor is connected to a data line of plurality of data lines, and a second terminal of the driving transistor is connected to the pixel capacitor. The display panel also includes a gate driving circuit, including a first driving unit and a second driving unit. The first driving unit and the second driving unit are cascaded. An output terminal of the first driving unit is electrically connected to the scan line, and an output terminal of the second driving unit is floating. In a scanning section of a frame time, the first driving unit provides a scanning signal to the sub-pixels of the display panel. In a corresponding front and rear porch section of the frame time immediately following the scanning section, the second driving unit receives a shift signal sent by the first driving unit. In a compensation section corresponding to the front and rear porch section, a data signal is provided to the data line.

Another aspect of the present disclosure includes a display device. The display device includes a display panel. The display panel includes a display area, a non-display area, and a plurality of pixel driving circuits arranged in an array. The plurality of pixel driving circuits are located in the display area, each driving circuit of the plurality of pixel driving circuits includes a driving transistor and a pixel capacitor, and the pixel capacitor corresponds to a sub-pixel. The display panel also includes a plurality of scan lines and a plurality of data lines. A control terminal of the driving transistor is connected to a scan line of the plurality of scan lines, a first terminal of the driving transistor is connected to a data line of plurality of data lines, and a second terminal of the driving transistor is connected to the pixel capacitor. The display panel also includes a gate driving circuit, including a first driving unit and a second driving unit. The first driving unit and the second driving unit are cascaded. An output terminal of the first driving unit is electrically connected to the scan line, and an output terminal of the second driving unit is floating. In a scanning section of a frame time, the first driving unit provides a scanning signal to the sub-pixels of the display panel. In a corresponding front and rear porch section of the frame time immediately following the scanning section, the second driving unit receives a shift signal sent by the first driving unit. In a compensation section corresponding to the front and rear porch section, a data signal is provided to the data line.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustrative purposes only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

It should be noted that in the present disclosure, relational terms such as "first" and "second" are used only to distinguish one entity or operation from another entity or operation, and do not necessarily require or imply any such actual relationship or order between these entities or operations. Moreover, terms "include", "comprise" or any other variations thereof are intended to cover non-exclusive inclusion. A process, a method, an article, or an equipment including a series of elements may not only include those elements, but also include other elements that are not explicitly listed, or elements inherent to the process, the method, the article, or the equipment. Without additional restrictions, when a phrase "including . . . " is used to identify an element, other identical elements may exist in a process, a method, an article, or an equipment including the element.

Figure 1:
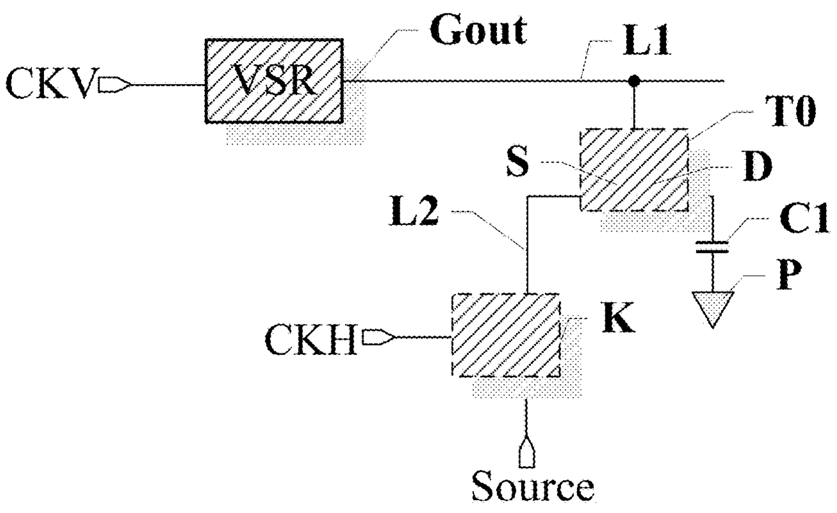
FIG. 1 illustrates a schematic circuit diagram of a display panel driven by a driving method consistent with the disclosed embodiments of the present disclosure.
Figure 2:
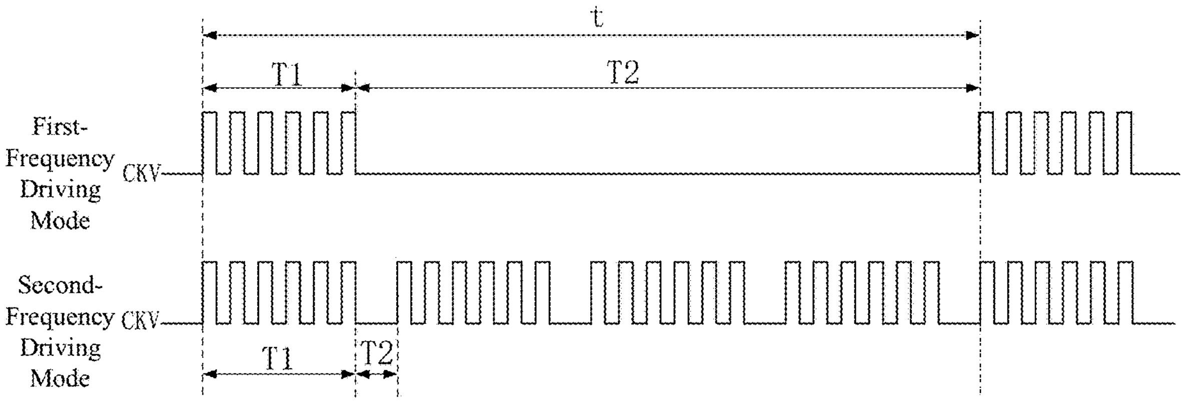
FIG. 2 illustrates an operation sequence diagram of a first-frequency driving mode and a second-frequency driving mode.
Figure 3:
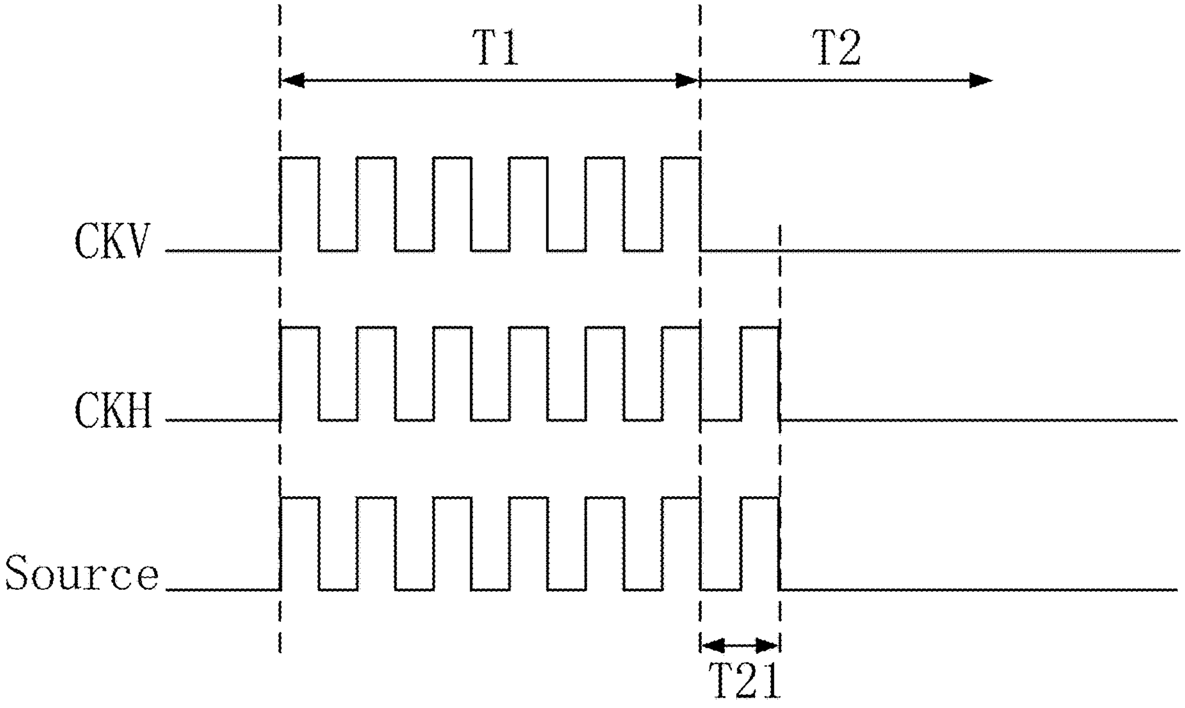
FIG. 3 illustrates an operation sequence diagram when a compensation section is added in a first-frequency driving mode, consistent with the disclosed embodiments of the present disclosure.

FIG. 1 illustrates a schematic circuit diagram of a display panel driven by a driving method consistent with the disclosed embodiments of the present disclosure. FIG. 2 illustrates an operation sequence diagram of a first-frequency driving mode and a second-frequency driving mode. The operation sequence diagram of the first-frequency driving mode shown in FIG. 2 does not include a compensation section. FIG. 3 illustrates an operation sequence diagram when a compensation section is added in a first-frequency driving mode. A CKV signal corresponds to an input waveform signal of a gate driving circuit VSR in FIG. 1. After passing through the gate driving circuit VSR, the CKV signal may output a Gout signal. The Gout signal may be used as a gate signal to control the turn-on or turn-off of the driving transistor T0 in the display panel. A CKH signal may be used as a switching signal to control whether a data signal of a data-signal output terminal Source is transmitted to a driving transistor T0. When a switch unit K is turned on, the data signal of the data-signal output terminal may be transmitted to the driving transistor T0.

With reference to FIG. 1 to FIG. 3, the present disclosure provides a driving method of a display panel. The driving method includes a first-frequency driving mode and a second-frequency driving mode. A first frequency of the first-frequency driving mode is lower than a second frequency of the second-frequency driving mode.

In the first-frequency driving mode, a frame time includes a scanning section T1 and a front and rear porch section T2, and the scanning section T1 and the front and rear porch section T2 are operated in sequence. In the scanning section T1, sub-pixels P of the display panel are scanned. In the front and rear porch section T2, the sub-pixels P of the display panel are not scanned.

The display panel includes a plurality of data line L2. The front and rear porch section T2 corresponding to at least part of the frames includes at least one compensation section T21. In the compensation section T21, a data signal is provided to each data line L2 of the plurality of data lines L2.

In one embodiment, the first frequency may be approximately 30 Hz, and the second frequency may be approximately 120 Hz.

In a driving method of a display panel provided by the present disclosure, with reference to FIG. 2, each of the first-frequency driving mode and the second-frequency driving mode includes a scanning section T1 and a front and rear porch section T2. In the scanning section T1, the CKV signal includes a plurality of pulse signals. In the front and rear porch section T2, the CKV signal includes a fixed low-level signal. In the first-frequency driving mode, the time corresponding to the front and rear porch section T2 between two adjacent scanning sections T1 may be longer. In the second-frequency driving mode, the time corresponding to the front and rear porch section T2 between two adjacent scanning sections T1 may be shorter. That is, a scanning frequency of the display panel in the first-frequency driving mode may be lower than the scanning frequency in the second-frequency driving mode. Taking FIG. 2 as an example, in the same time t, only one scan may be performed in the first-frequency driving mode, and in the second-frequency driving mode, four scans many be performed. In the low-frequency driving mode, the front and rear corridor time is longer. In the front and rear porch section T2, the sub-pixels of the display panel are not scanned. In the scanning section T1, the driving transistor T0 in FIG. 1 is in a turn-on state, and the data signal may be transmitted to the sub-pixels to realize image display. In the front and rear porch section T2, the driving transistor T0 is in a turn-off state, and the sub-pixels of the display panel are not scanned.

With continuous reference to FIG. 1 and FIG. 2, when the driving transistor T0 is in a turn-off state, since a second terminal of the driving transistor T0 is connected to a pixel capacitor C1 and a first terminal of the driving transistor T0 is connected to the data line L2, a voltage at the second terminal may be greater than a voltage at the first terminal. When the first terminal of the driving transistor T0 is a source S and the second terminal is a drain D, and a voltage of the drain D is greater than a voltage of the source S, the driving transistor T0 may have leakage current. A magnitude of the leakage current may be positively correlated with voltage difference Vds between the second terminal and the first terminal of the driving transistor T0. In the first-frequency driving mode, that is, the low-frequency driving mode, the refresh frequency of the display panel is low, and the front and rear porch section is long, that is, the waiting time is long. Since the waiting time is longer, leakage current of the driving transistor T0 may be more obvious.

In one embodiment, in the scanning section T1, the voltage corresponding to the second terminal of the driving transistor is V1, the display brightness of the sub-pixel corresponds to the display brightness under voltage V1. In the front and rear porch section T2, the driving transistor may have leakage current, causing the voltage corresponding to the second terminal of the driving transistor to decrease. At the cut-off time of the front and rear porch section, the voltage corresponding to the second terminal may be reduced to V2, where V2 is less than V1, and the display brightness of the sub-pixel corresponds to the display brightness under voltage V2. When the front and rear porch section is longer, the leakage current may be larger, the voltage V2 may be lower, and the display brightness of the sub-pixels may be smaller. That is, from the beginning to the end of the frame time, the brightness of the sub-pixels may decrease. In the low-frequency driving mode, when the front and rear porch section is long, the brightness change of the sub-pixels may be obvious. Accordingly, in the low-frequency driving mode, screen flashing or flickering may occur on the display panel, and the display effect of the display panel may thus be affected.

In a driving method provided by the present disclosure, referring to FIG. 1 to FIG. 3, in the first-frequency driving mode, at least one compensation section T21 is introduced in the front and rear porch section T2 corresponding to at least part of the frames. In the compensation section T21, the CKH signal controls the switch unit K between the data line L2 and the data-signal output terminal Source to be turned on, and the data-signal output terminal Source is configured to provide a data signal to the data line L2. The data signal may be provided to the first terminal of the driving transistor T0. Providing the data signal to the first terminal of the driving transistor T0 is equivalent to increasing the voltage of the first terminal of the driving transistor T0 in the front and rear porch section T2. When the voltage of the first terminal increases, the voltage difference Vds between the second terminal and the first terminal of the driving transistor T0 may decrease. That is, the leakage current of the driving transistor T0 corresponding to each sub-pixel may decrease. In this way, from the beginning to the end of one frame time, the voltage at the second terminal of the driving transistor T0 may remain unchanged, or a magnitude of a change of the voltage at the second terminal of the driving transistor T0 may be negligible. Accordingly, the brightness of the sub-pixels may not change, or a magnitude of the change may be negligible. As such, screen flashing or flickering due to the leakage current of the driving transistor T0 in the low-frequency driving mode may be reduced. Thus, display effect of the display panel may be improved.

In one embodiment, in the compensation section T21, the voltage value of the data signal provided to each data line L2 may be greater than or equal to the voltage value of each sub-pixel. In one embodiment, in the compensation section T21, the voltage value of the data signal provided to each of the data lines L2 is a fixed voltage value.

Specifically, in one embodiment, with continuous reference to FIG. 1, in a display panel driven by the driving method provided by the present disclosure, the first terminal of the driving transistor T0 is connected to the data line L2, and the second terminal is connected to the sub-pixel. When embodied in a circuit, the second terminal is connected to a pixel capacitor C1 corresponding to the sub-pixel, and the voltage value of the pixel capacitor C1 is the voltage value of the sub-pixel. In the first-frequency driving mode, that is, in the low-frequency driving mode, when the driving transistor T0 is turned off, the voltage value corresponding to the second terminal of the driving transistor T0 is equal to the voltage value of the sub-pixel. At this time, the voltage difference Vds between the second terminal and the first terminal of the driving transistor T0 may be represented as Vds=Vpixel−Vdata, where Vpixel is the voltage value of the sub-pixel, and Vdata is the voltage value on the data line L2. When a data signal is provided to the data line L2 in the front and rear porch section T2, the voltage value of Vdata corresponds to the voltage value of the data signal on the data line L2.

Figure 4:
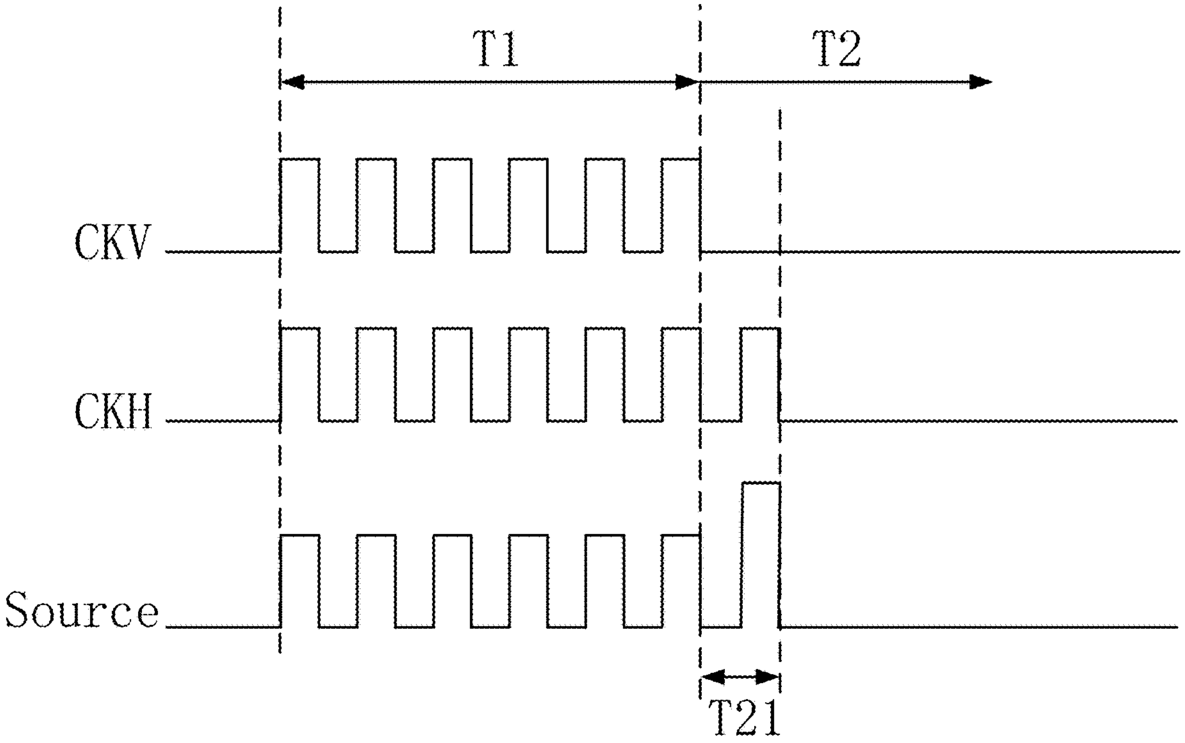
FIG. 4 illustrates another operation sequence diagram when a compensation section is added in a first-frequency driving mode, consistent with the disclosed embodiments of the present disclosure.

FIG. 4 illustrates another operation sequence diagram when a compensation section is added in a first-frequency driving mode. In the compensation section T21, referring to FIG. 4, the voltage value Vdata of the data signal provided to each data line L2 is greater than or equal to the voltage value Vpixel of each sub-pixel, such that Vds may be represented as 0 or a negative value. The voltage corresponding to the data signal provided to the first terminal of the driving transistor may increase the voltage of the first terminal of the driving transistor, reducing the voltage difference between the second terminal and the first terminal of the driving transistor. Thus, the leakage current from the second terminal to the first terminal of the driving transistor may be avoided. As a result, from the beginning to the end of the frame time, the voltage value of the second terminal of the driving transistor may remain unchanged, or a magnitude of a change of the voltage value of the second terminal of the driving transistor may be negligible. Accordingly, display brightness of the sub-pixels within the frame time may be uniform, and obvious changes from bright to dark may be avoided. Thus, screen flashing or flickering due to the leakage current of the driving transistor T0 in the low-frequency driving mode may be reduced, and display effect of the display panel may be improved.

Figure 5:
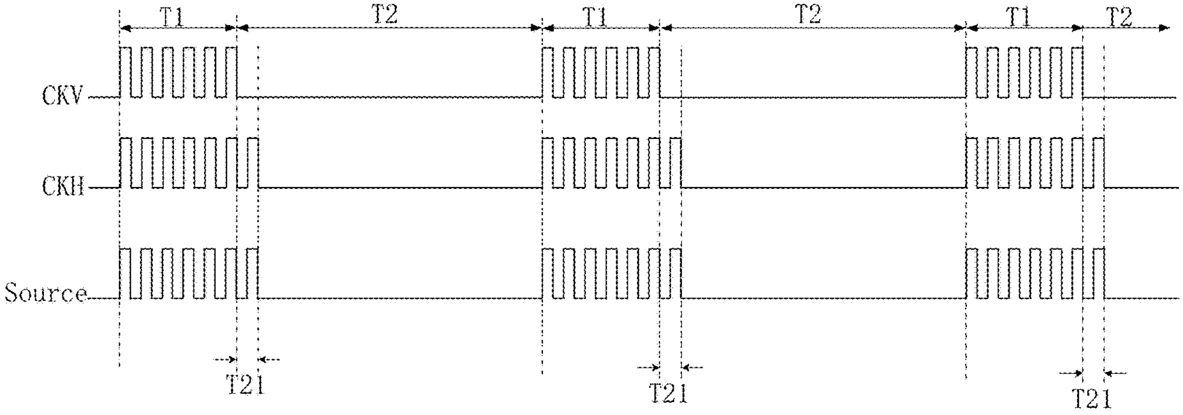
FIG. 5 illustrates another operation sequence diagram when a compensation section is added in a first-frequency driving mode, consistent with the disclosed embodiments of the present disclosure.

It should be noted that FIG. 3 and FIG. 4 only show the operation sequence diagrams corresponding to one frame time, and operation sequence diagrams of remaining frames may refer to the operation sequence diagrams shown in FIG. 3 and FIG. 4. FIG. 5 illustrates another operation sequence diagram when a compensation section is added in a first-frequency driving mode. FIG. 5 shows an operation sequence corresponding to a plurality of frames. In one embodiment, in the compensation sections T21 corresponding to different frames, the voltage values of the data signals provided to the data lines L2 are equal.

With continuous reference to FIG. 5, the compensation section T21 is introduced in each of the front and rear porch sections T2 corresponding to one frame of a plurality of frames. In the compensation sections T21 corresponding to different frames, the voltage values Vdata of the data signals provided to the data lines L2 are equal. Correspondingly, as shown in FIG. 5, in the compensation sections T21 for different frames, heights of the pulse signals output by the data-signal output terminal Source may be equal. In this way, the data signal with a fixed voltage value may be used to compensate the voltage of the first terminal of the driving transistor T0. Additional adjustment on the voltage value of the data signal in the compensation sections T21 corresponding to different frames may not be needed. Accordingly, complexity of signal control may be simplified, and the driving sequence may be simplified while data compensation to reduce the leakage current of the driving transistor T0 may be realized.

In one embodiment, with continuous reference to FIG. 5, each front and rear porch section T2 corresponding to a frame of the plurality of frames includes at least one compensation section T21.

With reference to FIG. 1 and FIG. 5, in an embodiment shown in FIG. 5, in the first-frequency driving mode, that is, in the low-frequency driving mode, each of the front and rear porch sections T2 corresponding to a frame of the plurality of frames includes at a compensation section T21. In this way, before each scanning section T1, the voltage of the first terminal of the driving transistor T0 is compensated. That is, the leakage current of the driving transistor T0 is adjusted before each scanning section T1. Accordingly, the image brightness corresponding to each frame time is the brightness after the leakage current of the driving transistor T0 is adjusted. Thus, the brightness of the sub-pixels in each frame time may be uniform, and obvious changes in brightness may be avoided. Consequently, uniformity of the display brightness of different frames of images may be improved, and a phenomenon of image flickering or screen flashing in the low-frequency driving mode may be avoided, and the display effect of the display panel may thus be improved.

Figure 6:
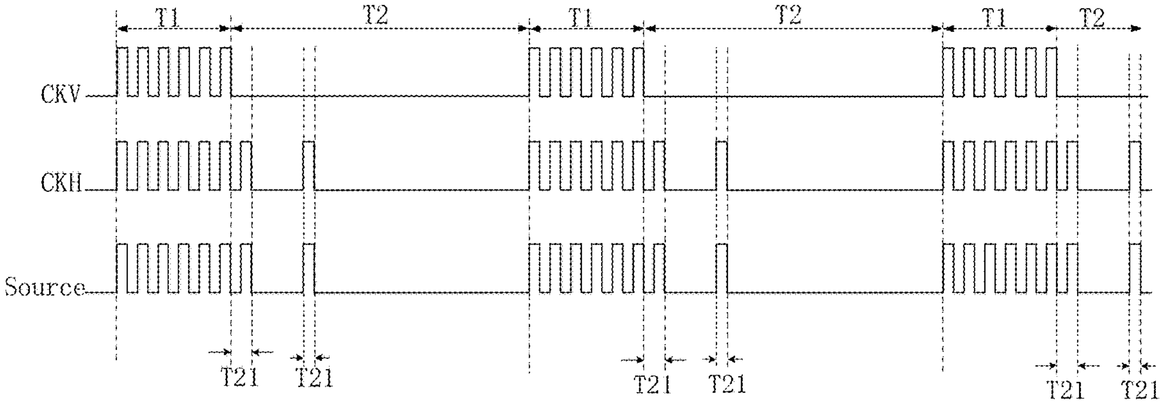
FIG. 6 illustrates another operation sequence diagram when a compensation section is added in a first-frequency driving mode, consistent with the disclosed embodiments of the present disclosure.

FIG. 6 illustrates another operation sequence diagram when a compensation section is added in a first-frequency driving mode. With reference to FIG. 1 and FIG. 6, in an embodiment shown in FIG. 6, in the first-frequency driving mode, that is, in the low-frequency driving mode, two compensation sections T21 are introduced in each of the front and rear porch sections T2 corresponding to the frames. That is, the data signal is provided to the data line L2 for two times in the front and rear porch section T2 corresponding to one frame. Accordingly, the voltage of the first terminal of the driving transistor T0 is compensated for two times. By compensating the voltage of the first terminal of the driving transistor for two times, the leakage current of the driving transistor T0 may be better reduced or eliminated before a next scanning period T1. As such, the screen flashing or flickering of the display panel in the low-frequency driving mode may be reduced, and the display effect of the display panel in the low-frequency driving mode may be improved.

It should be noted that, in one embodiment, as shown in FIG. 6, in the low-frequency driving mode, two compensation sections T21 are introduced in the front and rear porch section T2 corresponding to one frame time, and the two compensation sections T21 are discontinuous. In some other embodiments, three or more compensation sections T21 may be introduced in the front and rear porch section T2 corresponding to one frame time. The compensation sections T21 may be continuous or discontinuous. Either continuous or discontinuous compensation sections T21 may reduce the leakage current of the driving transistor T0. The present disclosure does not limit the number of the compensation sections T21, and the compensation sections T21 may be continuous or discontinuous.

In one embodiment, with reference to FIG. 1, FIG. 5 and FIG. 6, in one frame time, the signal provided to the data line L2 in the scanning section T1 includes a plurality of first pulse signals. One first pulse signal of the plurality of first pulse signals corresponds to one row of the sub-pixels respectively. The signal provided to the data line L2 in the compensation section T21 is a second pulse signal. The number of second pulse signals provided to the data line L2 during the compensation section T21 corresponding to one frame time is greater than or equal to one.

It should be noted that in the operation sequence diagrams provided by the present disclosure, the number of first pulse signals corresponding to the scanning section T1 is for illustrative purposes only, and does not represent the actual number of pulses. The number of first pulse signals corresponding to the scanning section T1 in one frame time corresponds to the number of rows of sub-pixels in the display panel. In the compensation section T21 corresponding to the front and rear porch section T2, the number of second pulse signals provided to the data line L2 is greater than or equal to 1. That is, the time for providing the second pulse signal to the data line L2 is greater than or equal to the time required for scanning a row of sub-pixels in the scanning section T1. In one embodiment, as shown in FIG. 5, one second pulse signal is provided to the data line L2 in the compensation section T21 corresponding to one frame time. In another embodiment, as shown in FIG. 6, two second pulse signals are provided to the data line L2 in the compensation section T21 corresponding to one frame time.

It should be noted that, when more second pulse signals are provided to the data line L2 in the compensation section T21 corresponding to one frame time, a better compensation effect may be achieved. But too many second pulse signals may also cause excessive power consumption of the display panel. In the present disclosure, the number of the second pulse signals provided to the data line L2 in the compensation section T21 corresponding to one frame time is controlled within a range of approximately one to ten. In this way, the screen flashing or flickering phenomenon of the displayed panel in the low frequency display mode may be reduced, and power consumption may also be reduced.

In one embodiment, with reference to FIG. 5 and FIG. 6, a first second pulse signal of the second pulse corresponding to the compensation section T21 and the plurality of first pulse signals corresponding to the scanning section T1 are continuous.

Specifically, with reference to FIG. 5 and FIG. 6, in the low-frequency driving mode, when the compensation section T21 is introduced in the front and rear porch section T2 corresponding to one frame time, the second pulse signal corresponding to the compensation section T21 is continuous with the first pulse signals corresponding to the scanning signal in the same frame time. That is, after the scanning section T1 is completed, the compensation section T21 starts immediately, and the voltage of the first terminal of the driving transistor T0 is compensated immediately. In the low-frequency driving mode, the front and rear porch section T2 may last for a longer time, that is, the turn-off state of the driving transistor T0 may be maintained for a longer time. When the turn-off time of the driving transistor T0 is longer, the leakage current may be more obvious. When the leakage current of the driving transistor T0 lasts for a period of time before the driving transistor T0 is compensated, the value of the data voltage that needs to be provided may become larger. In the present disclosure, immediately after the scanning section T1 is executed and the driving transistor T0 is turned off, a data signal is sent to the first terminal of the driving transistor T0. In this way, the leakage current of the driving transistor T0 may be reduced or eliminated. Meanwhile, the voltage value of the data signal provided to the first terminal of the driving transistor T0 may be reduced, and thus power consumption may also be reduced.

Figure 7:
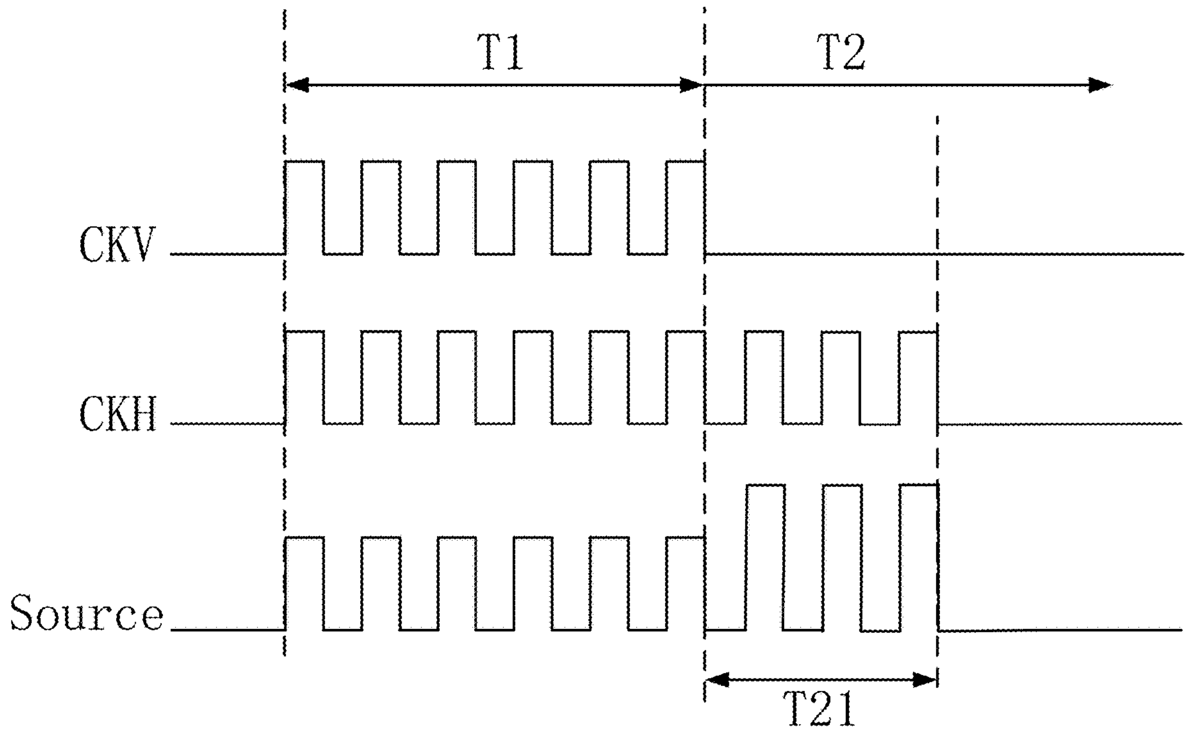
FIG. 7 illustrates another operation sequence diagram when a compensation section is added in a first-frequency driving mode, consistent with the disclosed embodiments of the present disclosure.

FIG. 7 illustrates another operation sequence diagram when a compensation section is added in a first-frequency driving mode. In one embodiment, as shown in FIG. 7, in one frame time, the signal provided to the data line L2 in the compensation section T21 includes a plurality of the second pulse signals. The plurality of the second pulse signals is continuous.

Specifically, with reference to FIG. 1 and FIG. 7, in an embodiment shown in FIG. 7, in the low-frequency driving mode, in the front and rear porch section T2 corresponding to one frame time, the compensation section T21 corresponds to a plurality of second pulse signals and the plurality of second pulse signals is continuous. When the plurality of second pulse signals is introduced in the compensation section T21 corresponding to one frame time, the voltage of the first terminal of the driving transistor T0 may be compensated by a plurality of times to eliminate or reduce the leakage current of the driving transistor T0. In addition, when the plurality of second pulse signals is set as continuous signals, the operation sequence of the compensation section T21 may be simplified, and the driving efficiency of the display panel may be improved.

Figure 8:
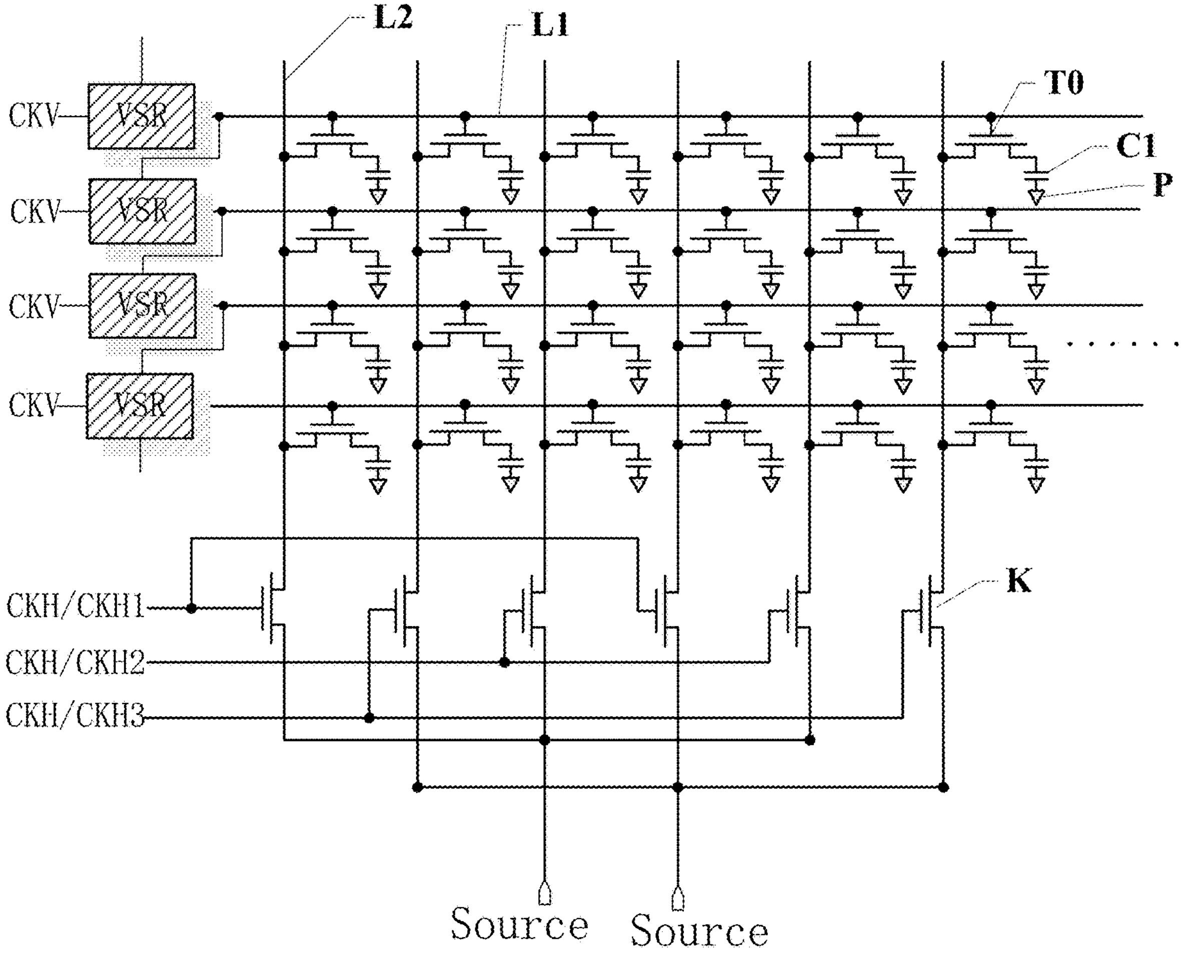
FIG. 8 illustrates a pixel driving circuit diagram of a display panel driven by a driving method consistent with the disclosed embodiments of the present disclosure.

FIG. 8 illustrates a pixel driving circuit diagram of a display panel driven by a driving method consistent with the disclosed embodiments of the present disclosure. In one embodiment, as shown in FIG. 8, the display panel includes a plurality of pixel driving circuits arranged in an array, and a pixel driving circuit of the plurality of pixel driving circuits includes a driving transistor T0 and a pixel capacitor C1. A control terminal of the driving transistor T0 is connected to the scan line L1, a first terminal of the driving transistor T0 is connected to the data line L2, and a second terminal of the driving transistor T0 is connected to the pixel capacitor C1.

In the driving method provided by the present disclosure, in the compensation section T21, the data signal may be provided to each data line L2 of the data lines L2. Specifically, the data signal may be provided to the first terminal of the driving transistor T0 through the data line L2.

Specifically, with reference to FIG. 8, the display panel includes a plurality of pixel driving circuits arranged in an array. FIG. 8 only uses 4 rows and 6 columns of pixel driving circuits as an example for illustrative purposes, and does not represent the number of pixel driving circuits actually included in the display panel. The display panel include a plurality of scan lines L1 and a plurality of data lines L2. In the pixel driving circuits located in a same row, the control terminals of the driving transistors T0 are electrically connected to a same scan line L1. In the pixel driving circuits located in a same column, the first terminals of the driving transistors T0 are electrically connected to a same data line L2. The second terminal of each driving transistor T0 is connected to a different pixel capacitor C1, corresponding to a different sub-pixel P.

In the scanning section T1, the output terminal of the gate driving circuit VSR outputs a control signal to the scanning line L1 to turn on the driving transistor T0. The data line L2 transmits the data signal to the first terminal of the driving transistor T0, and the driving transistor T0 generates a driving voltage for driving the sub-pixel to emit light. In the front and rear porch section T2, the output terminal of the gate driving circuit VSR outputs a control signal to the scan line L1 to turning off the driving transistor T0. In the compensation section T21 corresponding to the front and rear porch section T2, the data-signal output terminal Source provides a data signal to the first terminal of the driving transistor T0 through the data line L2. When the data signal is provided to the first terminal of the driving transistor T0, the voltage value of the first terminal of the driving transistor T0 may be increased, and the voltage difference between the second terminal and the first terminal of the driving transistor T0 may be reduced. Accordingly, the leakage current of the driving transistor T0 may be reduced, and the screen flashing or flickering phenomenon of the display panel caused by the leakage current of the driving transistor T0 in the low-frequency driving mode may thus be reduced. As a result, the display effect of the display panel in the low-frequency driving mode may be improved.

It should be noted that the data signal transmitted to the data line L2 during the compensation section T21 may be different from the data signal transmitted to the data line L2 during the scanning section T1. In one embodiment, the voltage value of the data signal transmitted to the data line L2 in the compensation section T21 is greater than the voltage value of the data signal transmitted to the data line L2 in the scanning section T1.

In one embodiment, with continuous reference to FIG. 8, the voltage value of the sub-pixel, the voltage value of the second terminal of the driving transistor T0, and the voltage value corresponding to the pixel capacitor C1 are equal.

In one embodiment, the display panel provided by the present disclosure is a liquid crystal display panel. The pixel capacitor C1 in the present disclosure is a capacitor corresponding to each sub-pixel. The voltage difference between two plates of the pixel capacitor C1 (that is, the voltage value corresponding to the pixel capacitor C1) is the driving voltage for driving the liquid crystal to deflect, that is, the voltage value of the sub-pixel. Since the second terminal of the driving transistor T0 is electrically connected to the pixel capacitor C1, the voltage value of the second terminal of the driving transistor T0 is equal to the voltage value of the pixel capacitor C1. In the present disclosure, the leakage current of the driving transistor T0 is positively correlated with the voltage difference between the second terminal and the first terminal, that is, is positively correlated with the voltage difference between the voltage value Vpixel of the sub-pixel and the voltage value Vdata of the data line L2. When the voltage difference between Vpixel and Vdata is large, the leakage current may be large. When a data signal is provided to the data line L2, the voltage value of the first terminal of the driving transistor T0 may be increased. Accordingly, the voltage difference between the second terminal and the first terminal of the driving transistor T0 may be reduced, and the leakage current of the driving transistor T0 may thus be reduced. As a result, the screen flashing or flickering phenomenon of the display panel caused by the leakage current of the driving transistor T0 may be reduced.

In one embodiment, with continuous reference to FIG. 8, the driving transistors T0 corresponding to the pixel capacitors C1 in a same column are connected to a same data line L2. The data line L2 is also electrically connected to the data-signal output terminal Source. The display panel further includes a plurality of switch units K. A switch unit K of the plurality of switch units K is connected in series between the data-signal output terminal Source and one of the data lines L2.

A data signal may be provided to the first terminal of the driving transistor T0 through the data line L2. Specifically, each switch unit K is turned on, the data-signal output terminal Source transmits the data signal to each data line L2, and each data line L2 provides the data signal to the first terminal of the corresponding driving transistor T0.

Specifically, with reference to FIG. 3, FIG. 4, and FIG. 8, in one embodiment of the present disclosure, a switch unit K is introduced between the data line L2 and the data-signal output terminal Source. The CKH signal is a control signal for controlling the switch unit K to be turned on or off. In the low-frequency driving mode, in the front and rear porch section T2 corresponding to one frame time, in the compensation section T21, the CKH signal is used to turn on each switch unit K, and the data-signal output terminal Source transmits the data signal to each data line L2. The data signal is further provided to the first terminal of each driving transistor T0, and the voltage compensation for the first terminal of the driving transistor T0 may thus be realized.

In one embodiment, in the display panel, one data-signal output terminal Source may be electrically connected to at least two switch units K. The control terminals of the at least two switch units K corresponding to the data-signal output terminal Source are connected to different control signal terminals. In one embodiment, as shown in FIG. 8, one data-signal output terminal Source is connected to three data lines L2 through three switch units K, respectively. Control terminals of the three switch units corresponding to the data-signal output terminal Source are respectively connected to control signal terminals CKH1, CKH2 and CKH3.

In the scanning section T1, the data-signal output terminal Source provides data signals to the three data lines L2 in a time-division manner, and time-division multiplexing of the data-signal output terminal Source may thus be realized. In this way, the number of the data-signal output terminals Source in the display panel may be decreased, the size of the driving chip electrically connected to the display panel may be reduced, and the structure of the driving chip may be simplified.

It should be noted that the operation sequence diagrams provided by the present disclosure only illustrate the operation sequence of the control signal CKH provided by a control signal terminal corresponding to the switch unit K. When the switch units K correspond to a plurality of control signal terminals, the waveform of the pulse signal of the control signal corresponding to each control signal terminal of the plurality of control signal terminals is same as the waveform provided in the accompanying drawings of the present disclosure. The difference between the control signals corresponding to different control signal terminals of the plurality of control signal terminals may lie only in the start time.

It should also be noted that in the low-frequency driving mode, in the compensation section T21 in the front and rear porch section T2 corresponding to one frame time, each control signal CKH may turn on each switch unit K at a same time, or may turn on the switch units K in a time-division manner. The present disclosure does not specifically limit whether each switch unit K is turned on at a same time.

Figure 9:
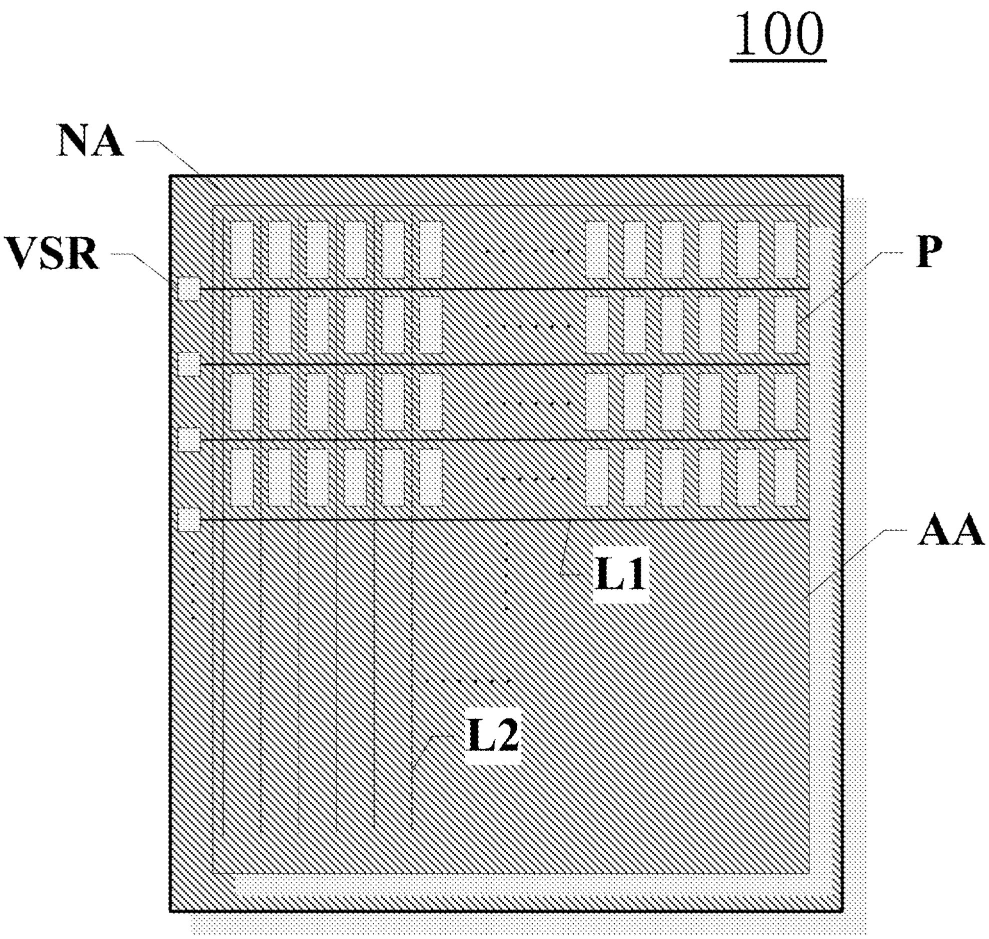
FIG. 9 illustrates a schematic structural diagram of a display panel consistent with the disclosed embodiments of the present disclosure.
Figure 10:
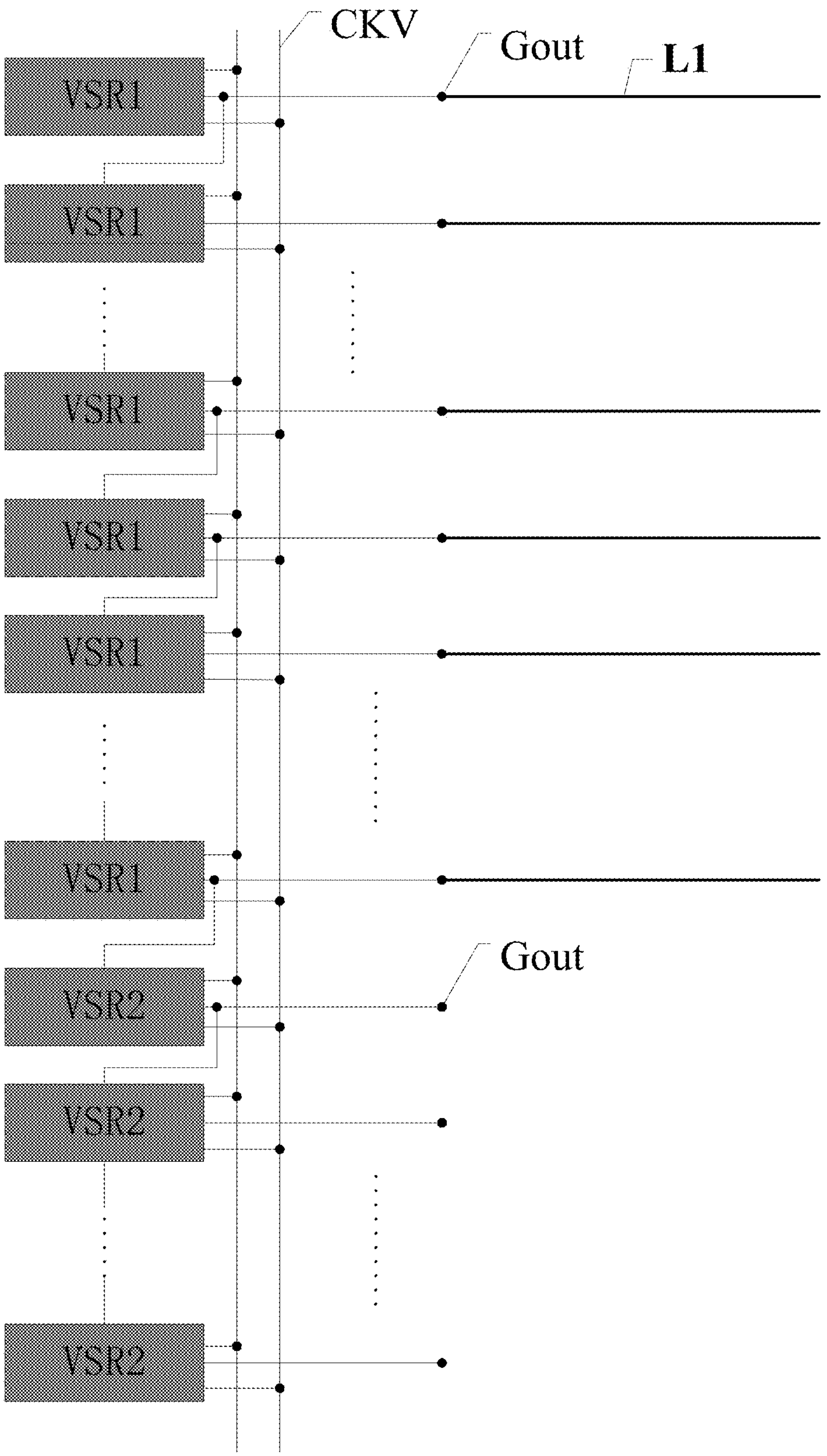
FIG. 10 illustrates a schematic structural diagram of a gate driving circuit consistent with the disclosed embodiments of the present disclosure.

The present disclosure also provides a display panel. FIG. 9 illustrates a schematic structural diagram of a display panel consistent with the disclosed embodiments of the present disclosure. FIG. 10 illustrates a schematic structural diagram of a gate driving circuit consistent with the disclosed embodiments of the present disclosure. With reference to FIG. 8 and FIG. 9, the display panel 100 includes a display area AA and a non-display area NA.

The display panel also 100 includes pixel driving circuits arranged in an array. The pixel driving circuits are located in the display area AA. Each drive circuit includes a driving transistor T0 and a pixel capacitor C1. Each pixel capacitor C1 corresponds to a sub-pixel P.

The display panel 100 also includes a plurality of scan lines L1 and a plurality of data lines L2. A control terminal of each driving transistor T0 is connected to the scan line L1, a first terminal of the driving transistor T0 is connected to the data line L2, and a second terminal of the driving transistor T0 is connected to the pixel capacitor C1.

The display panel 100 also includes a gate driving circuit. With reference to FIG. 10, the gate driving circuit includes cascaded first driving units VSR1 and second driving units VSR2. An output terminal Gout of the first driving unit VSR1 is electrically connected to the scan line L1, and an output terminal Gout of the second driving unit VSR2 is floating.

In the scanning section T1, the first driving unit VSR1 provides a scanning signal to the sub-pixels of the display panel. In the front and rear porch section T2, the second drive unit VSR2 receives a shift signal sent by the first drive unit VSR1. In the compensation section T21 corresponding to the front and rear porch section T2, a data signal is provided to the data line L2.

Specifically, referring to FIG. 3, FIG. 8, and FIG. 9, the display panel 100 provided by the present disclosure includes a first-frequency driving mode and a second-frequency driving mode. A first frequency of the first-frequency driving mode is lower than a second frequency of the second-frequency driving mode. The first-frequency driving mode may be taken as a low-frequency driving mode, and the second-frequency driving mode may be taken as a high frequency driving mode. In the first-frequency driving mode, a refresh frequency of the display panel is low. In the second-frequency driving mode, the refresh frequency of the display panel is high. In the first-frequency driving mode, one frame time includes a scanning section T1 and a front and rear porch section T2. In the scanning section T1, the sub-pixels of the display panel are scanned. At this time, data signals required for light-emitting are provided to each sub-pixel through the data line L2, such that the sub-pixels may emit light. In the front and rear porch section T2, the sub-pixels of the display panel are not scanned. The front and rear porch section T2 may be taken as a waiting section. In the present disclosure, at least one compensation section T21 is introduced in the front and rear porch sections T2 corresponding to at least part of the frames. In the compensation section T21, a data signal is provided to each data line L2. Since the first terminal of the driving transistor T0 in the display panel is connected to the data line L2, when the data signal is provided to the data line L2 in the front and rear porch section T2, the data signal may be provided to the first terminal of the driving transistor T0. A magnitude of the leakage current of the driving transistor T0 is positively related to a magnitude of the voltage difference between the second terminal and the first terminal of the driving transistor T0. When the data signal is provided to the first terminal of the driving transistor T0, the voltage of the first terminal of the driving transistor T0 may be increased. Accordingly, the voltage difference between the second terminal and the first terminal of the driving transistor T0 may be decreased, and thus the leakage current of the driving transistor T0 may be reduced. In this way, from the beginning to the end of one frame time, the voltage at the second terminal of the driving transistor T0 may remain unchanged, or a magnitude of the change of the voltage at the second terminal of the driving transistor T0 may be negligible. Accordingly, the brightness of the sub-pixels may not change, or a magnitude of the change of the brightness of the sub-pixels may be negligible. As such, screen flashing or flickering due to the leakage current of the driving transistor T0 in the low-frequency driving mode may be reduced. Thus, display effect of the display panel may be improved.

Referring to FIG. 10, in a display panel provided by the present disclosure, a first driving unit VSR1 and a second driving unit VSR2 are introduced into the gate driving circuit, and the first driving unit VSR1 and the second driving unit VSR2 are cascaded. The output terminal of the first driving unit VSR1 is electrically connected to the scan line L1, and is configured to provide a control signal to the scan line L1, to turn on or start the driving transistor T0 in the pixel driving circuit. The output terminal of the second driving unit VSR2 is not electrically connected to the scan line L1, and is floating. After the shift signal of the first driving unit VSR1 is transmitted to the second driving unit VSR2, the second driving unit VSR2 performs shifting only, and does not output a control signal to the scan line L1. That is, a shifting process of the first driving unit VSR1 corresponds to the scanning section T1 in one frame time, and a shifting process of the second driving unit VSR2 corresponds to the front and rear porch section T2 in one frame time. To match the front and rear porch stage T2, the present disclosure introduces the second gate driving unit in the gate driving circuit, and driving requirements of driving modes at different frequencies may thus be simplified. It should be noted that, in the display panel provided by the present disclosure, the number of the second driving units VSR2 may be set according to actual requirements. The present disclosure does not specifically limit the number of the second driving units VSR2.

In one embodiment, referring to FIG. 8, the display panel provided by the present disclosure further includes a plurality of data-signal output terminals Source and a plurality of switch units K. Each switch unit K is connected in series between one data-signal output terminal Source and one data line L2.

Specifically, with reference to FIG. 3 and FIG. 8, in one embodiment of the present disclosure, a switch unit K is introduced between the data line L2 and the data-signal output terminal Source. The CKH signal is a control signal for controlling the switch unit K to be turned on or off. In the low-frequency driving mode, in the front and rear porch section T2 corresponding to one frame time, in the compensation section T21, the CKH signal is used to turn on each switch unit K, and the data-signal output terminal Source transmits the data signal to each data line L2. The data signal is further provided to the first terminal of each driving transistor T0, and the voltage compensation for the first terminal of the driving transistor T0 may thus be realized.

In one embodiment, with reference to FIG. 8, one data-signal output terminal Source is electrically connected to at least two switch units K. The control terminals of the at least two switch units K corresponding to the data-signal output terminal Source are connected to different control signal terminals.

In one embodiment, as shown in FIG. 8, one data-signal output terminal Source is connected to three data lines L2 through three switch units K, respectively. In the scanning section T1, the data-signal output terminal Source provides data signals to the three data lines L2 in a time-division manner, and time-division multiplexing of the data-signal output terminal Source may thus be realized. In this way, the number of the data-signal output terminals Source in the display panel may be decreased, the size of the driving chip electrically connected to the display panel may be reduced, and the structure of the driving chip may be simplified.

Figure 11:
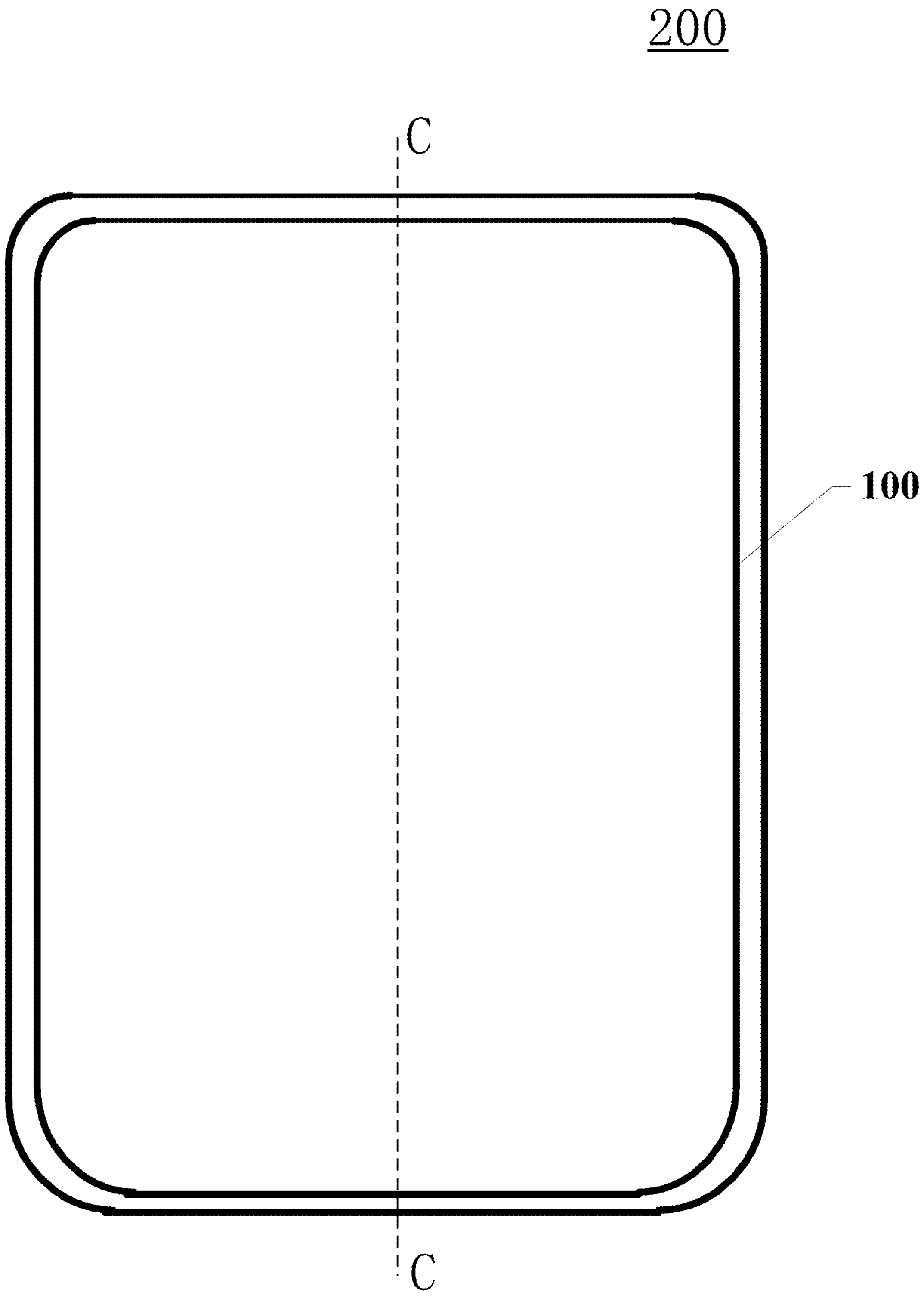
FIG. 11 illustrates a schematic diagram of a display device consistent with the disclosed embodiments of the present disclosure.
Figure 12:
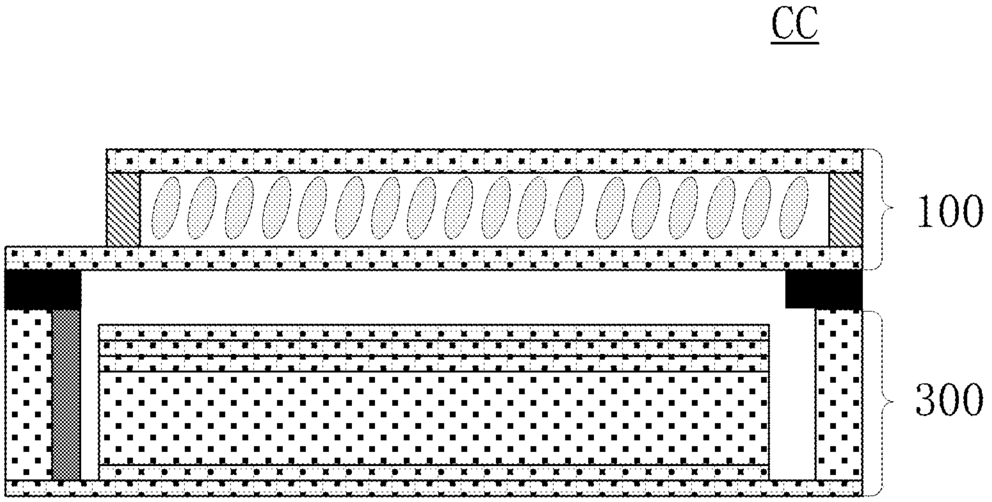
FIG. 12 illustrates a cross-sectional view at line CC of a display device shown in FIG. 11, consistent with the disclosed embodiments of the present disclosure.

The present disclosure also provides a display device. FIG. 11 illustrates a schematic diagram of a display device consistent with the disclosed embodiments of the present disclosure. FIG. 12 illustrates a cross-sectional view at line CC of a display device shown in FIG. 11. With reference to FIG. 11 and FIG. 12, the display device 200 includes a display panel 100 provided by the present disclosure. In one embodiment, the display panel provided by the present disclosure is a liquid crystal display panel, and the display device is a liquid crystal display device.

As shown in FIG. 12, in addition to the display panel 100 provided by the present disclosure, the display device 200 provided by the present disclosure may also include a backlight module 300. The display panel 100 may be disposed on a light-exiting surface of the backlight module 300. The backlight module 300 provides a light source required for the display panel 100 to display an image.

In the display device provided by the present disclosure, in the compensation section, when the data signal is provided to the first terminal of the driving transistor, the voltage of the first terminal of the driving transistor may be increased. Accordingly, the leakage current of the driving transistor may be reduced. As such, screen flashing or flickering due to the leakage current of the driving transistor T0 in the low-frequency driving mode may be decreased. Thus, display effect of the display panel may be improved.

It should be noted that, for implementation of the display device 200 provided by the present disclosure, reference may be made to the embodiments of the display panel 100. The display device 200 provided by the present disclosure may be any product or component with actual functions, such as a mobile phone, a tablet computer, a television, a monitor, a notebook computer, a digital photo frame, a navigator, and the like.

As disclosed, the technical solutions of the present disclosure have the following advantages.

In the driving method of a display panel, the display panel and the display device provided by the present disclosure, the driving method includes a first-frequency driving mode and a second-frequency driving mode. A first frequency of the first-frequency driving mode is lower than a second frequency of the second-frequency driving mode. The first-frequency driving mode may be taken as a low-frequency driving mode, and the second-frequency driving mode may be taken as a high frequency driving mode. In the first-frequency driving mode, a refresh frequency of the display panel is low. In the second-frequency driving mode, the refresh frequency of the display panel is high. In the first-frequency driving mode, one frame time includes a scanning section and a front and rear porch section. In the scanning section, the sub-pixels of the display panel are scanned. At this time, data signals required for light-emitting are provided to each sub-pixel through the data line, such that the sub-pixels may emit light. In the front and rear porch section, the sub-pixels of the display panel are not scanned. The front and rear porch section may be taken as a waiting section. In the present disclosure, at least one compensation section is introduced in the front and rear porch sections corresponding to at least part of the frames. In the compensation section, a data signal is provided to each data line. Since the first terminal of the driving transistor in the display panel is connected to the data line, when the data signal is provided to the data line in the front and rear porch section, the data signal may be provided to the first terminal of the driving transistor. A magnitude of the leakage current of the driving transistor is positively related to a magnitude of the voltage difference between the second terminal and the first terminal of the driving transistor. When the data signal is provided to the first terminal of the driving transistor, the voltage of the first terminal of the driving transistor may be increased. Accordingly, the voltage difference between the second terminal and the first terminal of the driving transistor may be decreased, and thus the leakage current of the driving transistor may be reduced. In this way, from the beginning to the end of one frame time, the voltage at the second terminal of the driving transistor may remain unchanged, or a magnitude of the change of the voltage at the second terminal of the driving transistor may be negligible. Accordingly, the brightness of the sub-pixels may not change, or a magnitude of the change of the brightness of the sub-pixels may be negligible. As such, screen flashing or flickering due to the leakage current of the driving transistor in the low-frequency driving mode may be reduced. Thus, display effect of the display panel may be improved.

The embodiments disclosed herein are exemplary only and not limiting the scope of this disclosure. Various combinations, alternations, modifications, equivalents, or improvements to the technical solutions of the disclosed embodiments can be obvious to those skilled in the art. Without departing from the spirit and scope of this disclosure, such combinations, alternations, modifications, equivalents, or improvements to the disclosed embodiments are intended to be encompassed within the scope of the present disclosure.

What is claimed is:

1. A driving method of a display panel, comprising:

driving the display panel in a first-frequency driving mode and a second-frequency driving mode, wherein:

a first frequency of the first-frequency driving mode is lower than a second frequency of the second-frequency driving mode; and in the first-frequency driving mode, a frame time includes a scanning section and a corresponding front and rear porch section immediately following the scanning section;

scanning sub-pixels of the display panel in the scanning section of the first-frequency driving mode, wherein: in the front and rear porch section, the sub-pixels of the display panel are not scanned; and front and rear porch sections corresponding to at least part of a plurality of frames in the first-frequency driving mode include at least one compensation section; and providing a data signal to each data line of a plurality of data lines of the display panel in a compensation section of the at least one compensation section, wherein there is no compensation section when driving the display panel in the second-frequency driving mode.

2. The driving method according to claim 1, wherein a voltage value of the data signal provided to each data line in the compensation section is equal to a voltage value of a data signal provided in a corresponding scanning section prior to the compensation section with a same frame time for displaying a single frame on the display panel.

3. The driving method according to claim 2, wherein, in the compensation section, the voltage value of the data signal provided to each data line is a fixed voltage value.

4. The driving method according to claim 1, wherein, in the compensation sections corresponding to different frames of the plurality of frames, the voltage values of the data signals provided to the plurality of data lines are equal.

5. The driving method according to claim 1, wherein each front and rear porch section corresponding to a frame of the plurality of frames includes at least one compensation section.

6. The driving method according to claim 1, wherein:

in the frame time, signals provided to the data line in the scanning section include a plurality of first pulse signals;

a first pulse signal of the plurality of first pulse signals corresponds to a row of the sub-pixels;

signals provided to the data line in the compensation section include a second pulse signal; and a quantity of the second pulse signal provided to the data line in the compensation section corresponding to one frame time is greater than or equal to one.

7. The driving method according to claim 6, wherein a first second pulse signal of the second pulse signal corresponding to the compensation section and the plurality of first pulse signals corresponding to the scanning section are continuous.

8. The driving method according to claim 6, wherein:

in one frame time, the signals provided to the data line in the compensation section include a plurality of the second pulse signals; and the plurality of the second pulse signals are continuous.

9. The driving method according to claim 1, wherein:

the display panel includes a plurality of pixel driving circuits arranged in an array;

a pixel driving circuit of the plurality of pixel driving circuits includes a driving transistor and a pixel capacitor, wherein a control terminal of the driving transistor is connected to a scan line, a first terminal of the driving transistor is connected to a data line, and a second terminal of the driving transistor is connected to the pixel capacitor; and providing the data signal to each data line in the compensation section includes providing the data signal to the first terminal of the driving transistor through the data line.

10. The driving method according to claim 9, wherein a voltage value of the sub-pixel, a voltage value of the second terminal of the driving transistor, and a voltage value corresponding to the pixel capacitor are equal.

11. The driving method according to claim 9, wherein:

the driving transistors corresponding to the pixel capacitors in a same column are connected to a same data line, and the data line is also electrically connected to a data-signal output terminal;

the display panel further includes a plurality of switch units, and a switch unit of the plurality of switch units is connected in series between the data-signal output terminal and one of the data lines; and the data signal is provided to the first terminal of the driving transistor through the data line, wherein each switch unit is turned on, the data-signal output terminal transmits the data signal to each data line, and each data line provides the data signal to the first terminal of the corresponding driving transistor.

12. The driving method according to claim 11, wherein:

one data-signal output terminal is electrically connected to at least two switch units; and control terminals of the at least two switch units electrically connected to the one data-signal output terminal are connected to different control signal terminals.

13. The driving method according to claim 12, wherein the one data-signal output terminal provides the data signal to the at least two switch units in a time-division manner.

14. The driving method according to claim 9, wherein the voltage value of the data signal provided to the data line in the compensation section is equal to the voltage value of the data signal provided to the data line in the scanning section.

15. A display panel, comprising:

a display area and a non-display area;

a plurality of pixel driving circuits arranged in an array, wherein the plurality of pixel driving circuits are located in the display area, each driving circuit of the plurality of pixel driving circuits includes a driving transistor and a pixel capacitor, and the pixel capacitor corresponds to a sub-pixel;

a plurality of scan lines and a plurality of data lines, wherein a control terminal of the driving transistor is connected to a scan line of the plurality of scan lines, a first terminal of the driving transistor is connected to a data line of plurality of data lines, and a second terminal of the driving transistor is connected to the pixel capacitor; and a gate driving circuit, including a first driving unit and a second driving unit, wherein the first driving unit and the second driving unit are cascaded, an output terminal of the first driving unit is electrically connected to the scan line, and an output terminal of the second driving unit is floating, wherein:

in a scanning section of a frame time, the first driving unit provides a scanning signal to the sub-pixels of the display panel;

in a corresponding front and rear porch section of the frame time immediately following the scanning section, the second driving unit receives a shift signal sent by the first driving unit; and in a compensation section corresponding to the front and rear porch section, a data signal is provided to the data line, wherein there is no compensation section when driving the display panel in the second-frequency driving mode.

16. The display panel according to claim 15, further comprising a plurality of data-signal output terminals and a plurality of switch units, wherein each switch unit of the plurality of switch units is connected in series between a data-signal output terminal of the plurality of data-signal output terminals and a data line of the plurality of data lines.

17. The display panel according to claim 16, wherein:

one data-signal output terminal of the plurality of data-signal output terminals is electrically connected to at least two switch units; and control terminals of the at least two switch units electrically connected to the one data-signal output terminal are connected to different control signal terminals.

18. The display panel according to claim 17, wherein the one data-signal output terminal provides the data signal to the at least two switch units in a time-division manner.

19. A display device, comprising a display panel including:

a display area and a non-display area;

a plurality of pixel driving circuits arranged in an array, wherein the plurality of pixel driving circuits are located in the display area, each driving circuit of the plurality of pixel driving circuits includes a driving transistor and a pixel capacitor, and the pixel capacitor corresponds to a sub-pixel;

a plurality of scan lines and a plurality of data lines, wherein a control terminal of the driving transistor is connected to a scan line of the plurality of scan lines, a first terminal of the driving transistor is connected to a data line of plurality of data lines, and a second terminal of the driving transistor is connected to the pixel capacitor; and a gate driving circuit, including a first driving unit and a second driving unit, wherein the first driving unit and the second driving unit are cascaded, an output terminal of the first driving unit is electrically connected to the scan line, and an output terminal of the second driving unit is floating, wherein:

in a scanning section of a frame time, the first driving unit provides a scanning signal to the sub-pixels of the display panel;

in a corresponding front and rear porch section of the frame time immediately following the scanning section, the second driving unit receives a shift signal sent by the first driving unit; and in a compensation section corresponding to the front and rear porch section, a data signal is provided to the data line, wherein there is no compensation section when driving the display panel in the second-frequency driving mode.

20. The display device according to claim 19, further comprising a backlight module, wherein:

the display panel is disposed on a light-exiting surface of the backlight module; and the backlight module provides a light source required for the display panel to display an image.

* * * * *